United States Patent [19]

Jones et al.

[11] 3,905,954

[45] Sept. 16, 1975

[54] ACTIVATED CELLULOSE

[75] Inventors: David Thomas Jones, Ystalysera; Kenneth Rowland Rees, Dunvant; George Edward Jowett, Uplands, all of Wales

[73] Assignee: Viscose Development Company Limited, Croydon, England

[22] Filed: July 21, 1972

[21] Appl. No.: 273,766

[30] Foreign Application Priority Data

July 23, 1971 United Kingdom............... 34645/71

[52] U.S. Cl. ............... 260/212; 106/122; 210/500; 252/176; 260/218; 264/191; 264/195; 264/196
[51] Int. Cl.² ...................... C08B 15/00; C08L 1/24
[58] Field of Search ........... 264/191, 192, 194, 195, 264/196, 197; 106/122; 260/218, 212

[56] References Cited

UNITED STATES PATENTS

| | | | |
|---|---|---|---|
| 1,936,479 | 11/1933 | Koch.................................. | 264/192 |
| 2,021,864 | 11/1935 | Lilienfeld............................ | 264/192 |
| 2,125,031 | 7/1938 | Polak et al......................... | 260/218 |
| 2,860,480 | 11/1958 | Cox.................................... | 264/194 |
| 3,068,545 | 12/1962 | Stiner................................. | 106/122 |
| 3,296,000 | 1/1967 | Bockno et al...................... | 264/194 |
| 3,364,290 | 1/1968 | Antema et al. .................... | 264/191 |
| 3,501,419 | 3/1970 | Bridgeford......................... | 106/168 |
| 3,553,306 | 1/1971 | Church.............................. | 264/218 |
| 3,591,667 | 7/1971 | Kulshrestha ...................... | 264/218 |

FOREIGN PATENTS OR APPLICATIONS

| | | | |
|---|---|---|---|
| 368,288 | 2/1932 | United Kingdom................ | 260/212 |
| 390,519 | 4/1933 | United Kingdom................ | 260/212 |
| 459,124 | 12/1936 | United Kingdom................ | 260/212 |
| 546,493 | 9/1956 | Belgium............................. | 260/212 |
| 981,362 | 1/1965 | United Kingdom................ | 260/212 |

*Primary Examiner*—Ronald W. Griffin
*Attorney, Agent, or Firm*—Brisebois & Kruger

[57] ABSTRACT

Ion exchange activated cellulose in the form of porous bodies, caps, tubes, beads, granules or powders is prepared by reacting unregenerated cellulose with a compound having ionizable chemical groups which impart ion exchange properties to the cellulose reaction product and then regenerating said product.

11 Claims, No Drawings

ACTIVATED CELLULOSE

This invention relates to activated cellulose and, more especially, to cellulose ion-exchange materials.

An ion-exchange material in general consists of an inert substrate into which are introduced ionizable chemical groups which are normally basic or acidic in nature and capable of binding anions or cations, respectively, by a process analogous to salt formation. Such bound ions may be exchanged for different ions when the chemical environment of the material is changed.

Ion-exchange materials based on cellulose substrates have been prepared by combining a suitable compound containing an ionizable chemical group with natural or regenerated cellulose. The hitherto proposed materials are, however, costly because of their expensive preparation and have other disadvantages.

A particular disadvantage of the hitherto proposed ion exchange materials based on natural or regenerated cellulose is their limited exchange capacity for relatively large ions, for example, ions derived from proteins or carbohydrates. Further, the previously proposed materials based on regenerated cellulose can be prepared satisfactorily in only a few physical forms. Thus, for example, difficulties arise in preparing an ion exchange material from cellulose that has been regenerated in the form of a sponge. The activating conditions tend to bring about a degradation of the sponge structure and produce an irregular pore size distribution and a tendency towards physical instability. Also, combination between the activating substance and the regenerated cellulose is mainly restricted to the cellulose surface. Similar difficulties arise in activating regenerated cellulose in other physical forms, for example, films.

The fibrous character of natural cellulose also imposes physical limitations, and restricts the range of applications for which ion exchange materials based thereon can be employed and renders such materials unsuitable, for example, for the extraction of proteins from waste effluents.

The present invention provides a process for the preparation of an ion exchange activated regenerated cellulose wherein a substance which combines with cellulose and contains an ion exchange active component is incorporated before the final regeneration of the cellulose.

The process of the invention enables ion exchange activated regenerated celluloses to be obtained in a wide variety of physical forms, including many that have hitherto been difficult or impossible to attain. Further, the activated regenerated cellulose is generally obtained relatively economically and has superior absorption and/or ion exchange properties for large ions. Examples of large ions for which the ion exchange activated regenerated cellulose will generally be found suitable include ions derived from proteins such as enzymes and components of blood and tissue; carbohydrates, for example, charged polysaccharides such as the mucopolysaccharides; nucleic acids, for example, ribonucleic acids and deoxyribonucleic acids; dyestuffs, for example, Congo Red; fatty acids, and quaternary ammonium compounds.

The present invention is especially directed to the preparation of ion-exchange activated cellulose and the active component is therefore preferably an ionizable chemical group as discussed hereinbefore. Suitable substances which may be associated with cellulose to form ion-exchange materials are well known in the art. There may be mentioned, for example, compounds containing amino, alkylamino, guanidino and quaternary amino groups for the preparation of anion-exchange materials, e.g. diethylamino ethyl chloride, di(hydroxyethyl)amino ethyl chloride, dimethylamino ethyl chloride, 1-(diethylamino)-2,3-epoxy propanol, p-morpholino ethyl chloride and salts thereof; and compounds containing sulpho, phosphoric and carboxyl groups for cation-exchange materials, e.g. chloromethane sulphonic acid, chloroethane sulphonic acid and 1,3-propane sultone.

Compounds are also known which can be attached to cellulose to form materials capable of fixing biologically active materials such as, for example, enzymes. (see, for example, British Patent No. 1,183,259), and the use of such compounds is also included within the scope of the present invention. Thus, for example, the activating substance may be a compound containing pendant triazinyl groups. Preferably, in addition to such an activating substance, an activating substance is used in which the active component is an ionizable chemical group.

It will in most cases be preferable to cross-link the cellulose to some extent so as to obtain extra structural stability. Any of the cross-linking agents known in the art may be used for this purpose including, for example, epichlorhydrin, dichlorhydrin, dibromoethane, dichloroethane, 1,2,-3,4-diepoxybutane, bisepoxy propyl ether, ethylene glycol bisepoxy propyl ether and 1,4-butanediol bisepoxy propyl ether. The above-mentioned cross-linking agents are generally employed in alkaline solution, e.g. aqueous sodium hydroxide. It is also possible to use other chemical cross-linking agents such as aldehydes, e.g. formaldehyde, which are employed in acidic solution. Alternatively, cross-linking may be achieved physically by using ionising radiation such as ultra-violet radiation, gamma rays or electron beams, optionally in the presence of sensitizing chemicals. Cross-linking may be effected either simultaneously with the incorporation of the activating substances, in which case the activating substances should of course not interfere with cross-linking (or vice-versa), or may be carried out at another stage in the regeneration process. It will in some cases be advantageous to effect the cross-linking even after the cellulose has been regenerated.

The properties of the finished product will depend to some extent on the degree of cross-linking utilised, and the degree of cross-linking can be controlled in accordance with the final properties required. In general, however, the degree of cross-linking will be from 0.1 to 10%, especially from 1 to 10%, expressed in terms of the weight of cross-linking agent and the dry weight of the regenerated cellulose, although up to 30% may be required in order to obtain special properties. It will be appreciated that the degree of cross-linking selected in any given case will depend on the degree of substitution and degree of solubility of the cellulose material.

The present invention is especially applicable to the viscose process for the preparation of regenerated cellulose and in an especially preferred embodiment of the present invention a regenerated cellulose is prepared by the following steps:

1. Preparation of alkali cellulose. This can be achieved by any suitable method including the traditional one of soaking sheets of wood pulp in caustic soda, pressing out surplus caustic soda, and disintegrating the sheets to form crumbs of alkali cellulose. Instead, the alkali cellulose may be prepared by grinding natural cellulose to a powder and impregnating the powder with a limited quantity of caustic soda solution.
2. Treat with an ion-exchange activating substance, for example, diethylchloromethylamine hydrochloride, and with a cross-linking agent such as epichlorhydrin.
3. Treat with caustic soda.
4. Treat with carbon disulphide.
5. Dissolve the product in a solution of caustic soda.
6. Precipitate in the required form by a known regeneration method, for example, by the action of heat; by means of an acid; by treatment with a hot strong electrolyte; or by treatment with a strong electrolyte followed by an acid. One or more reinforcing agents and/or poreforming materials may be added prior to regeneration. Examples of reinforcing agents include hemp, flax, cotton, viscose yarn, nylon and polyester. As pore-forming materials there may be mentioned sodium sulphate and sodium phosphate.

The activating substance and/or the cross-linking agent can be incorporated at other stages prior to regeneration, or the cross-linking agent may be incorporated after regeneration. Mixtures of two or more activating substances and/or cross-linking agents can be employed if desired.

The activated regenerated cellulose may be prepared in any of a wide variety of forms as may be required. Examples of such forms include a spongey porous body, a rigid or semi-rigid porous body, a film, a sheet, a cap, a filament, a tube or a rod (of any desired section) or a particulate form such as beads, granules or a powder.

Furthermore, the cellulose may, if required, be regenerated into or onto a support comprising an inert material such as, for example, a rigid porous mass of a ceramic material. In this way, a considerable variety of physical forms can be obtained, for example, packing for columns. Instead, after regeneration, the cellulose may be incorporated into a matrix or support, which is preferably formed of an inert material, so as to obtain special forms or structures. For example, an activated regenerated cellulose in particulate form may be incorporated into a porous bag or container made of an inert material, or into a cartridge formed of inert material and having porous end walls.

The present invention is also applicable to the preparation of regenerated cellulose by methods other than the viscose process, for example, the cuprammonium and acid regeneration process.

Ion-exchange materials prepared according to the process of the present invention have the ability to absorb larger ions than has generally heretofore been the case, and have relatively high exchange capacities for large ions. Accordingly, the materials can be used for a widely differing range of ions. Further, the ion-exchange material is dimensionally stable, especially if partially cross-linked, and is relatively resistant to disintegration. The present invention accordingly also provides an ion-exchanger which includes an ionexchange material prepared according to the above process.

It is a feature of materials prepared according to the process of the present invention that, because the activating substance is well dispersed within the cellulose solution when regeneration takes place, it becomes distributed uniformly throughout the precipitated cellulose, as distinct from being concentrated mainly at the surfaces of the cellulose.

It will be appreciated that optimum ion-exchange capacity, for large molecules is not compatible with a high degree of rigidity produced by extensive cross-linking, since the cross-linking reduces the extent to which the activating substance is accessible for exchange purposes.

The activated regenerated cellulose has properties which produce advantages in fields other than ion-exchange, and the present invention is therefore not to be construed as limited to the use of the regenerated cellulose only for ion-exchange methods. For example, the activated material may be used as an anti-clotting agent when dialysing blood.

Whilst the present invention is especially applicable to the preparation of activated regenerated cellulose, it may also be used for the preparation of activated regenerated cellulose derivatives, for example, methyl cellulose, ethyl cellulose, hydroxyethyl cellulose, ethylhydroxy ethyl cellulose and allyl cellulose.

The quantity of activating substance incorporated with the cellulose may be from 20 to 80% by weight (based on the dry weight of the cellulose).

The following Examples illustrate the invention:

EXAMPLE 1

Natural cellulose in the form of the steeping-grade pulp normally supplied to the Viscose industry was steeped in 18% (w/v) caustic soda solution, and the steeped pulp was drained and then pressed to a press ratio of 3.3. The resulting alkali cellulose, which comprised 27.5% cellulose, 15.5% caustic soda, and 57% water, was shredded in a Z-arm grinder to form crumbs.

363.5 Gm. of the alkali cellulose crumbs were conditioned at 5°C. in a Z-arm mixer, and 58.3 gm. N,N-diethyl 2-chloroethylamine hydrochloride were added to the cool crumbs. The resulting mass was mixed for 30 minutes at 5°C., after which time the temperature was raised to 50°C. and reaction allowed to continue for a further 60 minutes. The temperature was then reduced to 30°C. and 65 gm. carbon disulphide were added to the reacting mass. The ensuing xanthation reaction was allowed to continue for 60 minutes at 30°C., giving a diethylaminoethyl, (DEAE), cellulose xanthate having a $\gamma$ number of 89. (As will be understood by those skilled in the art, the $\gamma$ number provides a measure of the degree of substitution of the cellulose by xanthate groups).

An activated regenerated cellulose sponge was produced from the DEAE cellulose xanthate as follows:

153.5 Gm. of 18.8% (w/v) caustic soda and 802 gm. water were added to 651.4 gm. of the xanthate to yield a viscose solution. 51.5 Gm. cotton fibre as reinforcing agent and 5,500 gm. of $Na_2SO_4 \cdot 10H_2O$ (Glauber's Salt) as pore-forming agent were then added to the solution, yielding a paste. The paste was extruded into small cylindrical moulds and was then regenerated in sodium sulphate solution at 95°–100°C., the concentration of $Na_2SO_4$ being 25% (w/v). The resulting sponge had an ion exchange capacity (for small ions, for example, Cl⁻) of 0.95 meq/gm.

EXAMPLE 2

DEAE cellulose xanthate was prepared as described in Example 1, and a viscose solution was prepared therefrom by treating 651.4 gm. of the xanthate with 385 gm. of 18.8% (w/v) caustic soda solution and 3415 gm. water. The viscose solution was then diluted with water in the ratio of 1 part viscose to 5 parts water. After dilution, the viscose was sprayed by means of compressed air into a regenerating solution comprising 0.5% sulphuric acid and 10% sodium sulphate. The cellulose was thereby regenerated in the form of a fine powder (200–400 mesh B.S.S.) which was washed to remove by-products and was then found to have an ion exchange capacity of 1.13 meq/gm.

EXAMPLE 3

A viscose solution (DEAE cellulose) was prepared as described in Example 2. A film was cast from the solution by weighing 25 gm. of the viscose onto a metal tray 6 inches square and one-fourth inch deep. The viscose was spread over the whole tray and a uniform film thickness was obtained by passing a knife over the surface. After discarding surplus viscose, the film was coagulated by immersing the tray in 30% ammonium sulphate for 20 minutes. The coagulated film was then removed from the tray and immersed for 20 minutes in 12% sulphuric acid to complete the regeneration.

After being washed to remove residual acid and salts, the film was dried and ground and had an ion exchange capacity of 1.09 meq/gm.

EXAMPLE 4

This Example illustrates simultaneous xanthation and activation.

To 1340 gm. of CEPO powdered cellulose SS200 (made by Svenska Tramjol Sfabrikerna) contained in a Z-arm mixer was added a solution of 300 gm. caustic soda and 400 gm. N,N-diethyl 2-chloroethylamine hydrochloride in 1000 gm. water, followed immediately by 650 gm. carbon disulphide. The mass was mixed at 5°C. for 30 minutes, after which time the temperature was raised to 30°C. and the reaction was allowed to continue for a further 90 minutes at that temperature.

The DEAE cellulose xanthate product was made into viscose as described in Example 3, and an ion exchange film was produced from the viscose as described in that Example. The ion exchange capacity of the film, after drying and grinding, was 0.79 meq/gm.

EXAMPLE 5

Carboxymethyl cellulose was prepared by reacting natural cellulose with caustic soda and with chloroacetic acid as activating agent. A clear viscose solution was obtained from the carboxymethyl cellulose by dispersing 100 gm. of the cellulose in 2500 gm. of 17.0% (w/v) caustic soda solution, adding 15 mls. of carbon disulphide, and tumbling the resulting mass for 2½ hours at 25°C.

One portion of the viscose solution was regenerated as described in Example 1 to form a sponge (ion exchange capacity 0.46 meq/gm), and another portion was regenerated as described in Example 3 to form a film (ion exchange capacity 0.59 meq/gm).

EXAMPLE 6

To 134 gm. of CEPO SS200 cellulose powder (Svenska) was added a solution of 50 gm. of N,N-diethyl 2-chloroethylamine hydrochloride, 30 gm. of caustic soda, 0.2 gm. epichlorhydrin and 100 gm. of water. The mass was mixed for 30 minutes at a temperature of 5°C, then raised to a temperature of 50°C for a further 60 minutes, yielding a cross-linked DEAE cellulose.

The reaction mixture was cooled to 30°C., and 65 gm. carbon disulphide were added to initiate xanthation. Xanthation was continued for 60 minutes at 30°C. and the product was then dissolved to give a viscose solution as described in Example 2. Regeneration was then effected as described in that Example to give a fine powder having an ion exchange capacity of 1.14 meq/gm.

EXAMPLE 7

Powdered activated regenerated cellulose was prepared as described in Example 2. Cross-linking of the cellulose was effected by treating 100 gm. of the powder in a Z-arm mixer with a solution of 2.5 gm. epichlorohydrin, 30 gm. caustic soda, and 100 gm. water. The mass was raised to 50°C. for 20 minutes, and was then washed free of by-products to yield a cross-linked regenerated DEAE cellulose having an ion exchange capacity of 1.11 meq/gm.

EXAMPLE 8

10 Gm. of DEAE cellulose produced as described in Example 1 (up to, but not including, xanthation) was dissolved in 100 ml. of commercially available Shirley Cuprammonium solution with stirring. The resulting solution was cast into a film as described in Example 3 and regenerated by treatment with sulphuric acid, yielding an activated regenerated cellulose film having an ion exchange capacity of 1.0 meq/gm.

EXAMPLE 9

A viscose solution (DEAE cellulose) was prepared as described in Example 2, and Hydronyl LA 3032 one-fourth inch porous ceramic spherical beads were saturated with the viscose solution under vacuum. The vacuum was then released, the surplus viscose drained away, and the DEAE cellulose regenerated onto the porous support by treatment with 12.5% sodium sulphate/sulphuric acid solution. The uptake of dry regenerated DEAE cellulose was 28.6% by weight, based on the dry weight of the beads.

The foregoing Examples illustrate, inter alia, the variety of physical forms in which activated regenerated cellulose can be produced in accordance with the invention. In order to demonstrate the other principal advantage of the process according to the present invention, the exchange capacity for large ions of the products certain of the Examples were determined as follows:

Each ion exchanger was "precycled" in known manner. (Precycling refers to the conventional technique of successive absorption/desorption of ions effected at continually increasing pH). After precycling, each exchange material was suspended in 10 volumes of 0.1.M. chloride-tris buffer at pH 8.35, poured into a column (30 cm. × 1.5 cm.), and washed with 0.01M chloride-tris buffer at pH 8.35 (approximately one litre of buffer being employed) until the pH and conductivity of the column eluate were identical with those of the starting buffer.

Sufficient of the ion exchange material (0.5–1.0 gm. dry weight was then stirred with 700–800 mg. of bovine serum albumin in 75 ml. of the same buffer. Small samples (1–3 ml.) were withdrawn at intervals, centrifuged, and the albumin content was estimated spectrophotometrically (280 nm).

The test procedure was carried out on the powder produced in Example 2, on the films produced in Example 3 and 4, and on the cross-linked material produced in Example 7. In order to provide a basis for comparison with the products of the invention, the procedure was repeated using Whatman DE-52 and a sample of the activated (DEAE) natural cellulose produced by the steps described in Example 1 up to, but not including, xanthation. Whatman DE-52 is a mercerised, crystalline, cross-linked natural cellulose.

The results of the investigations are shown in the following Table, from which the superior properties of the products obtained in accordance with the invention is clearly evident.

| Ion exchange material | Albumin capacity (mg/gm) |
| --- | --- |
| Example 2 | 928 |
| Example 3 | 798 |
| Example 4 | 480 |
| Example 7 | 366 |
| Whatman DE-52 | 313 |
| Activated natural cellulose | 288 |

We claim:

1. A process for preparing an ion exchange activated cellulose in the form of porous bodies, caps, tubes, beads, granules or powders, which comprises reacting unregenerated cellulose with a compound having ionizable chemical groups which impart ion exchange properties to the cellulose reaction product, and thereafter regenerating the activated cellulose reaction product to yield an activated regenerated cellulose having ion exchange properties.

2. A process according to claim 1, which includes the step of cross-linking the cellulose to produce additional structural stability in the product.

3. A process according to claim 2, wherein said cross-linking is effected simultaneously with the incorporation of said activating compound with the unregenerated cellulose.

4. A process according to claim 2, wherein said cross-linking is effected after regeneration of the cellulose.

5. A process according to claim 2, wherein the cellulose is cross-linked to the extent of from 0.1 to 10%.

6. A process according to claim 1, which comprises preparing alkali cellulose, reacting the alkali cellulose with said activating compound and with carbon disulphide, dissolving the material so obtained in caustic soda solution and regenerating the resulting viscose to yield an activated regenerated cellulose.

7. A process according to claim 1, wherein a quantity of from 20 to 80% by weight of the ion exchange activating compound based on the dry weight of the unregenerated cellulose is incorporated with said cellulose.

8. A process according to claim 1, wherein regeneration is effected by the action of heat.

9. A process according to claim 1, wherein regeneration is effected by treatment with a strong electrolyte in combination with thermal treatment.

10. A process according to claim 1, wherein regeneration is effected by spraying the cellulosic medium into an acidic regenerating solution.

11. A process according to claim 1, wherein the cellulose is regenerated on a support.

* * * * *